US009765850B2

(12) United States Patent
Himmelmann

(10) Patent No.: US 9,765,850 B2
(45) Date of Patent: Sep. 19, 2017

(54) SATURATION-CONTROLLED VARIABLE DAMPER SYSTEMS AND METHODS

(71) Applicant: Goodrich Corporation, Charlotte, NC (US)

(72) Inventor: Richard A. Himmelmann, Beloit, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 39 days.

(21) Appl. No.: 14/882,086

(22) Filed: Oct. 13, 2015

(65) Prior Publication Data

US 2017/0102047 A1    Apr. 13, 2017

(51) Int. Cl.

| F16F 15/18 | (2006.01) |
|---|---|
| F16F 7/00 | (2006.01) |
| B64C 25/50 | (2006.01) |
| H02K 1/27 | (2006.01) |
| H02K 16/04 | (2006.01) |

(52) U.S. Cl.
CPC .......... *F16F 15/18* (2013.01); *F16F 7/00* (2013.01); *B64C 25/505* (2013.01); *H02K 1/2786* (2013.01); *H02K 16/04* (2013.01)

(58) Field of Classification Search
CPC ... F16F 7/00; F16F 15/18; F16F 15/03; B64C 25/505; H02K 16/04; H02K 1/2786; H02K 3/12; H02K 49/043
USPC ........................................... 188/267
See application file for complete search history.

(56) References Cited

U.S. PATENT DOCUMENTS

| 4,663,581 A | 5/1987 | Glennon | |
|---|---|---|---|
| 5,064,029 A * | 11/1991 | Araki | H02K 49/043 188/164 |
| 5,236,069 A * | 8/1993 | Peng | F16F 15/03 188/267 |
| 5,238,095 A * | 8/1993 | Pedu | H02K 49/065 188/267 |

(Continued)

FOREIGN PATENT DOCUMENTS

| CN | 202503378 | 10/2012 |
|---|---|---|
| CN | 103208893 | 7/2013 |

(Continued)

OTHER PUBLICATIONS

U.S. Appl. No. 14/882,140, filed Oct. 13, 2015 and entitled Axial Engagement-Controlled Variable Damper Systems and Methods.

(Continued)

*Primary Examiner* — Thomas Irvin
(74) *Attorney, Agent, or Firm* — Snell & Wilmer, L.L.P.

(57) ABSTRACT

The present disclosure provides a stator assembly comprising a high damping core, a low damping core coaxially aligned with the high damping core, a plurality of slots defined in at least one of the high damping core and the low damping core and extending between a first axial end face and a second axial end face of the at least one of the high damping core and the low damping core, and a control winding being integrally continuous and successively wound through the plurality of slots, such that the control winding enters the plurality of slots from at least one of the first axial end face and the second axial end face. In various embodiments, the control winding is configured to receive a current.

19 Claims, 7 Drawing Sheets

(56) References Cited

U.S. PATENT DOCUMENTS

| | | | |
|---|---|---|---|
| 5,711,404 A * | 1/1998 | Lee | A63B 21/0051 188/158 |
| 5,714,823 A | 2/1998 | Shervington et al. | |
| 5,803,404 A * | 9/1998 | Petrou | B64C 1/24 188/267 |
| 6,176,355 B1 * | 1/2001 | Yamamoto | H02K 49/043 188/158 |
| 6,557,673 B1 * | 5/2003 | Desta | B60T 13/748 188/267 |
| 6,936,948 B2 * | 8/2005 | Bell | H02K 1/2786 29/596 |
| 6,948,597 B2 * | 9/2005 | Kuwahara | H02K 49/046 188/158 |
| 6,965,183 B2 * | 11/2005 | Dooley | H02K 1/2786 310/179 |
| 7,126,313 B2 * | 10/2006 | Dooley | H02K 1/2786 310/112 |
| 7,583,063 B2 * | 9/2009 | Dooley | H02K 1/2786 290/52 |
| 7,919,894 B2 * | 4/2011 | Dooley | H02K 1/2786 310/201 |
| 7,923,874 B2 * | 4/2011 | Himmelmann | F16F 15/121 310/261.1 |
| 8,878,657 B2 * | 11/2014 | Periquet | F16F 9/535 188/267 |
| 2007/0096581 A1 | 5/2007 | Zepp et al. | |
| 2008/0042509 A1 | 2/2008 | Dooley et al. | |
| 2008/0079401 A1 | 4/2008 | Dooley | |
| 2008/0088195 A1 | 4/2008 | Dooley et al. | |
| 2010/0044144 A1 | 2/2010 | Tajima et al. | |
| 2010/0264768 A1 | 10/2010 | Alfermann et al. | |
| 2010/0323804 A1 * | 12/2010 | Himmelmann | F16F 15/121 464/180 |
| 2011/0006545 A1 * | 1/2011 | Himmelmann | H02K 7/006 290/1 C |
| 2011/0062805 A1 | 3/2011 | Savant | |
| 2011/0101817 A1 | 5/2011 | Hao et al. | |
| 2013/0187504 A1 | 7/2013 | Tanaka | |
| 2015/0090545 A1 | 4/2015 | Zuo et al. | |

FOREIGN PATENT DOCUMENTS

| | | |
|---|---|---|
| CN | 104578659 | 4/2015 |
| EP | 0367387 | 5/1990 |
| EP | 1367701 | 12/2003 |
| EP | 2778047 | 9/2014 |
| EP | 2916032 | 9/2015 |
| GB | 2192041 | 12/1987 |
| GB | 2500442 | 9/2013 |
| JP | H0274146 | 3/1990 |
| WO | 2010064978 | 6/2010 |
| WO | 2011110857 | 9/2011 |

OTHER PUBLICATIONS

U.S. Appl. No. 14/882,238, filed Oct. 13, 2015 and entitled Axial Engagement-Controlled Variable Damper Systems and Methods.
Extended European Search Report dated Apr. 28, 2017 in European Application No. 16193472.4.
Extended European Search Report dated Apr. 28, 2017 in European Application No. 16193658.8.

* cited by examiner

SATURATION-CONTROLLED VARIABLE DAMPER SYSTEMS AND METHODS

FIELD OF THE DISCLOSURE

The present disclosure relates to variable damper systems and methods, and more particularly, to saturation-controlled variable damper systems and methods.

BACKGROUND OF THE DISCLOSURE

Aircraft nose wheel actuators may comprise a rotary damper to address shimmy in the nose wheel. The rotary damper may comprise a permanent magnet electric machine configured to create drag on the nose wheel actuator through rotation of a motor shaft and permanent magnet assembly about an electromagnetic stator.

Typically, such rotary dampers have a fixed damping coefficient. Stated differently, such rotary dampers create drag torque proportional to the speed of the motor shaft by a fixed damping coefficient. However, drag torque decreases efficiency. Rotary dampers with a fixed damping coefficient create constant drag torque, limiting the responsiveness and performance of the nose wheel actuator. Moreover, size requirements for the nose wheel actuator may increase in order to overcome the fixed drag torque created by rotary dampers having a fixed damping coefficient.

SUMMARY OF THE DISCLOSURE

In various embodiments, the present disclosure provides a stator assembly comprising a high damping core, a low damping core coaxially aligned with the high damping core, and a plurality of slots defined in at least one of the high damping core and the low damping core and extending between a first axial end face and a second axial end face of the at least one of the high damping core and the low damping core. In various embodiments, the stator assembly further comprises a control winding being integrally continuous and successively wound through the plurality of slots such that the control winding enters the plurality of slots from at least one of the first axial end face or the second axial end face. In various embodiments, the control winding is configured to receive a current.

In various embodiments, the high damping core and the low damping core comprise portions of an integral stator. In various embodiments, the control winding is configured to receive direct current. In various embodiments, the low damping core comprises a plurality of laminations. In various embodiments, the high damping core comprises at least one of aluminum, copper, or steel. In various embodiments, the low damping core comprises steel.

In various embodiments, the present disclosure provides a saturation-controlled variable damper comprising a stator assembly disposed about an axis of rotation, the stator assembly comprising a high damping core, a low damping core, and a plurality of slots defined in at least one of the high damping core and the low damping core and extending between a first axial end face and a second axial end face of the at least one of the high damping core and the low damping core. In various embodiments, the saturation-controlled variable damper further comprises a rotor assembly coaxially aligned with the stator assembly and disposed about the axis of rotation and a control winding being integrally continuous and successively wound through the plurality of slots, such that the control winding enters the plurality of slots from at least one of the first axial end face and the second axial end face, the control winding being configured to receive a current.

In various embodiments, the high damping core and the low damping core comprise portions of an integral stator. In various embodiments, the high damping core is coaxially aligned with the low damping core. In various embodiments, the saturation-controlled variable damper further comprises a controller in electrical communication with the control winding. In various embodiments, the controller is configured to supply a direct current to the control winding. In various embodiments, the low damping core comprises a plurality of laminations. In various embodiments, the high damping core comprises at least one of aluminum, copper, or steel. In various embodiments, the low damping core comprises steel.

In various embodiments, the present disclosure provides a method comprising applying at least a first current and a second current through a control winding of a saturation-controlled variable damper, and generating at least a first drag torque and a second drag torque. In various embodiments, the first drag torque is generated in response to the first current being applied through the control winding and the second drag torque is generated in response to the second current being applied through the control winding.

In various embodiments, the first current is zero and the first drag torque is greater than zero. In various embodiments, in response to the first current being less than the second current, the first drag torque is greater than the second drag torque. In various embodiments, in response to the first current being greater than the second current, the first drag torque is less than the second drag torque. In various embodiments, at least one of the first current and the second current is continuously variable and at least one of the first drag torque and the second drag torque is continuously variable. In various embodiments, the high damping core and the low damping core comprise portions of an integral stator.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

FIG. 5b illustrates a cross section view of FIG. 5a;

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft nose wheel rotary dampers. However, various aspects of the disclosed embodiments may be adapted for optimized performance with a variety of damper systems and methods. As such, numerous applications of the present disclosure may be realized.

Figure 1:
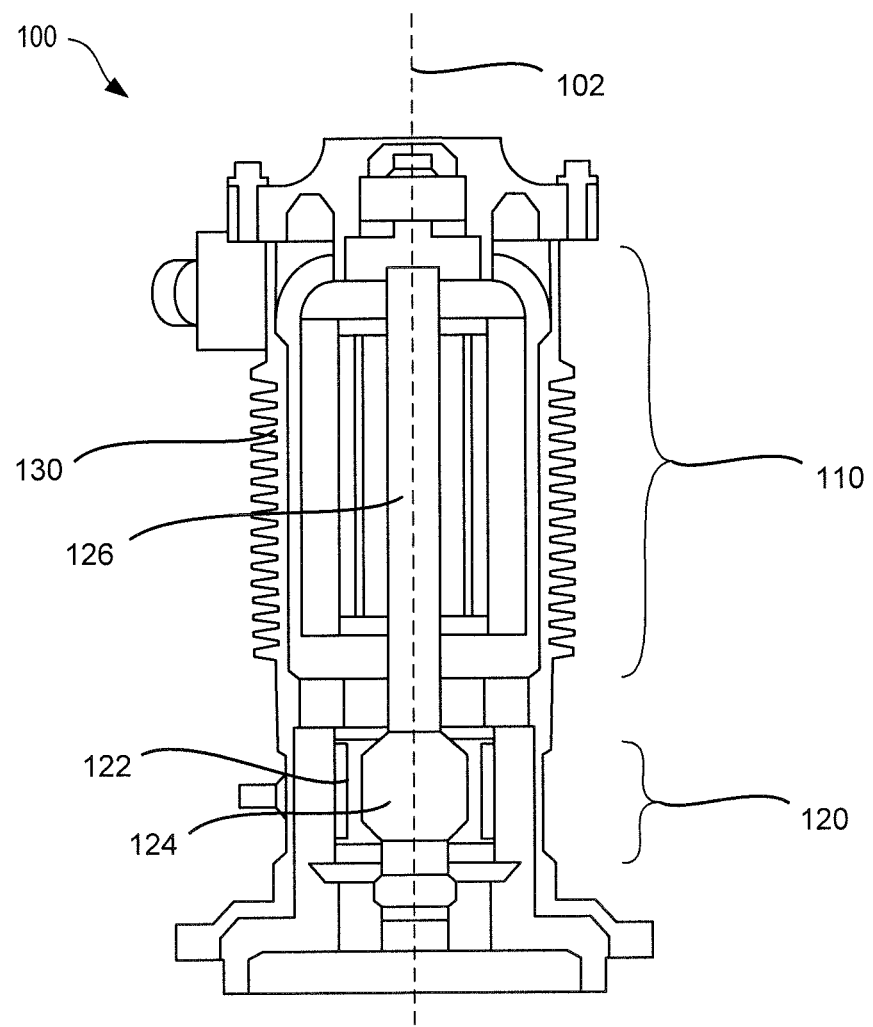
FIG. 1 illustrates a cross section view of a nose wheel actuator assembly in accordance with various embodiments.

Referring to FIG. 1, a nose wheel actuator assembly 100 may comprise a motor portion 110, a damper portion 120, and a housing 130 configured to at least partially surround the motor portion 110 and the damper portion 120 in accordance with various embodiments. The nose wheel actuator assembly 100 is disposed about an axial centerline axis, which is the axis of rotation 102. The motor portion 110 is configured to generate power to steer a nose wheel of an aircraft.

In various embodiments, the damper portion 120 may comprise a permanent magnet electric machine. In such embodiments, the damper portion 120 may comprise a stator assembly 122 coaxially aligned with a rotor assembly 124 and disposed about a rotor shaft 126. In various embodiments, the stator assembly 122 may comprise a conductive material. In various embodiments, the rotor assembly 124 may comprise one or more permanent magnets 423 (with momentary reference to FIG. 4). During rotation of the rotor shaft 126, the permanent magnets 423 (with momentary reference to FIG. 4) disposed on the rotor assembly 124 rotate relative to the stator assembly 122, creating eddy currents. Such eddy currents create electromagnetic drag torque on the motor portion 110. FIG. 1 provides a general understanding of various portions of a nose wheel actuator assembly, and is not intended to limit the disclosure.

Figure 2:
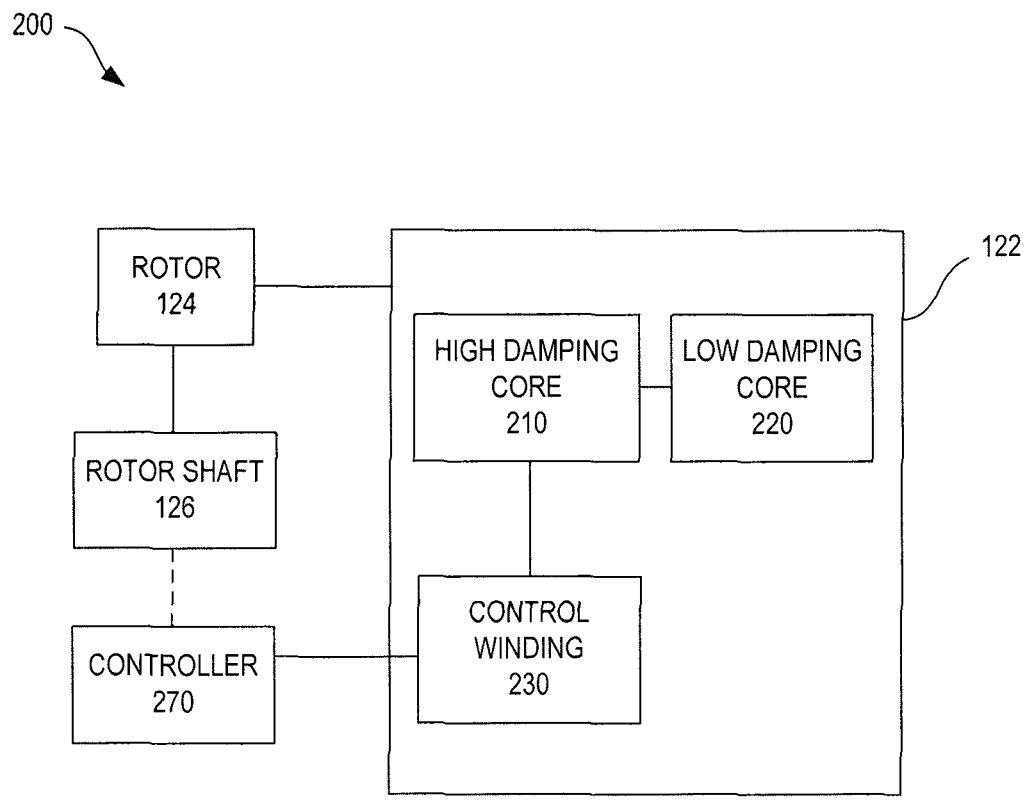
FIG. 2 illustrates a box diagram of a portion of a saturation-controlled variable damper in accordance with various embodiments.

In various embodiments and with reference to FIG. 2, a saturation-controlled variable damper 200 may comprise a stator assembly 122 configured to adjustably control drag torque created by the saturation-controlled variable damper 200. In such embodiments, a damping coefficient of the saturation-controlled variable damper 200 may be variable. Stated differently, in various embodiments, the saturation-controlled variable damper 200 may create drag torque proportional to the speed of the rotor shaft 126 by a variable damping coefficient. In various embodiments, the variable damping coefficient may be adjustably controlled by application of a variable current to a control winding 230 of stator assembly 122.

In various embodiments, the saturation-controlled variable damper 200 may comprise a controller 270 configured to adjustably control at least one of a voltage applied to the control winding 230 or a current generated in the control winding 230. In various embodiments, the controller 270 may be configured to command the application of a voltage to the control winding 230. In various embodiments, the controller 270 may be configured to command the application of a direct current to the control winding 230.

In various embodiments, the controller 270 may be in electrical communication with at least one of the stator assembly 122 and the rotor shaft 126. In various embodiments, the controller 270 may be in electrical communication with the control winding 230. In various embodiments, the controller 270 may be configured to adjustably control rotation of the rotor shaft 126. In various embodiments, the controller 270 may comprise at least one of a flight control system or a steering control system. In various embodiments, the controller 270 may comprise a processor configured to implement various logical operations in response to execution of instructions, for example, instructions stored on a non-transitory, tangible, computer-readable medium.

Figure 3:
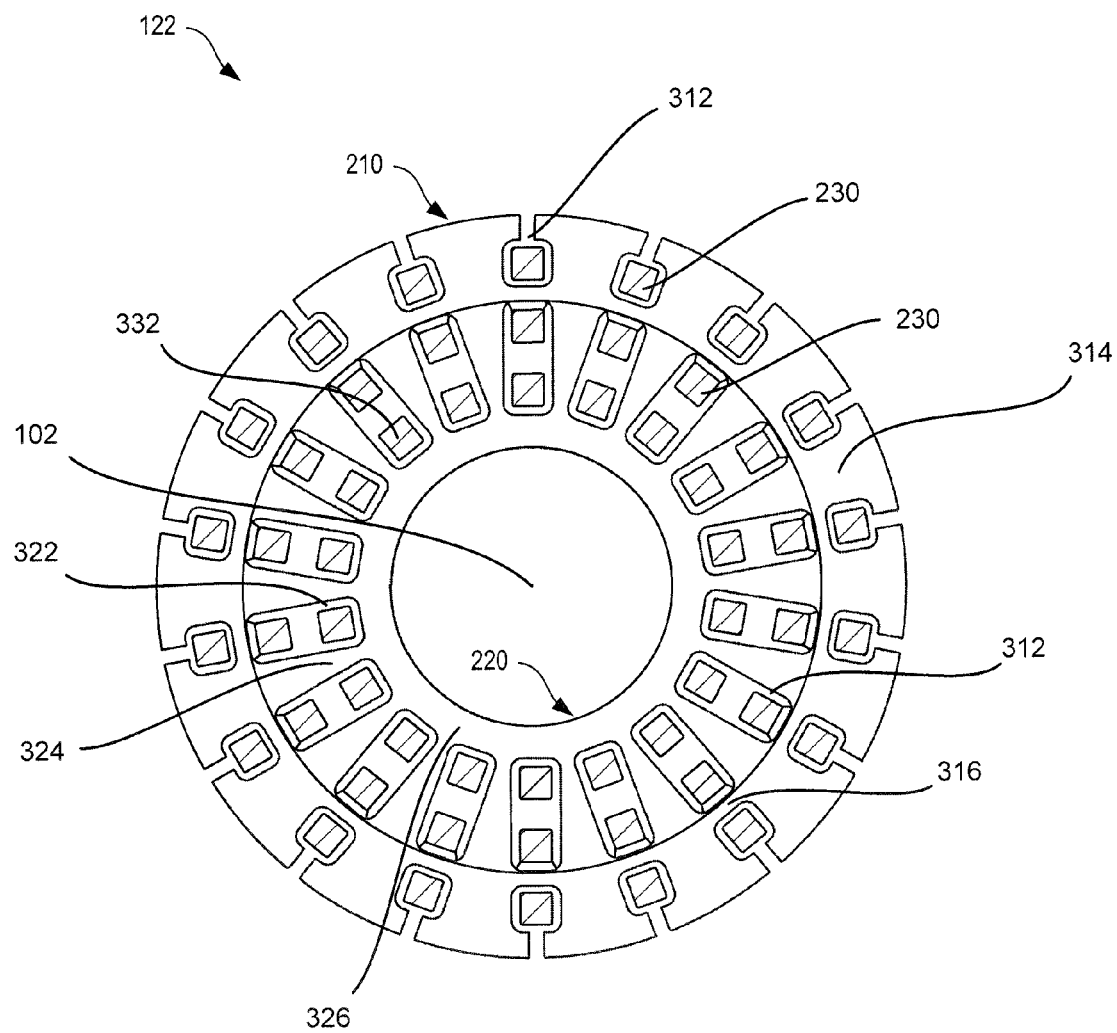
FIG. 3 illustrates a cross section view of a stator assembly in accordance with various embodiments.

With reference to FIG. 2 and FIG. 3, the stator assembly 122 may comprise a high damping core 210 coaxially aligned with, and disposed about, a low damping core 220. In various embodiments, the high damping core 210 and the low damping core 220 may comprise portions of an integral stator. In various embodiments, the high damping core 210 and the low damping core 220 may comprise separate stators that are coaxially aligned and/or operatively coupled.

In various embodiments, the high damping core 210 may comprise a plurality of slots 312 defined between a plurality of teeth 314. In various embodiments, the plurality of slots 312, and the plurality of teeth 314 may be disposed radially about the axis of rotation 102. In various embodiments and with momentary reference to FIG. 6, each slot of the plurality of slots 312 may extend from a first axial end face 602 to a second axial end face 603 of the stator assembly 122. In various embodiments, the high damping core 210 may further comprise a bridge portion 316 extending circumferentially about the axis of rotation 102 and bridging adjacent teeth in the plurality of teeth 314.

In various embodiments, the high damping core 210 may be configured to produce eddy currents in response to relative motion between the stator assembly 122 and the rotor assembly 124. In various embodiments, the high damping core 210 may comprise a conductive material. In various embodiments, the high damping core 210 may comprise at least one of a metal, a metal alloy, or a combination of one or more metals or alloys. In various embodiments, the high damping core 210 may comprise at least one of aluminum, copper, or steel. However, in various embodiments, the high damping core 210 may comprise any material suitable for use in the stator assembly 122.

In various embodiments, the low damping core 220 may be configured to decrease or minimize production of eddy currents in response to relative motion between the stator assembly 122 and the rotor assembly 124. In various embodiments, the low damping core 220 may comprise an electromagnetic material. In various embodiments, the low damping core 220 may comprise at least one of a metal, a metal alloy, or a combination of one or more metals or alloys. In various embodiments, the low damping core 220 may comprise steel. However, in various embodiments, the low damping core 220 may comprise any material suitable for use in the stator assembly 122. In various embodiments, the low damping core 220 may comprise a plurality of laminations.

In various embodiments, the low damping core 220 may comprise a plurality of low damping core slots 322 defined between a plurality of low damping core teeth 324. In various embodiments, the plurality of low damping core slots 322, and the plurality of low damping core teeth 324 may be disposed radially about the axis of rotation 102. In various embodiments and with momentary reference to FIG. 6, each slot of the plurality of slots 322 may extend from a first axial end face 602 to a second axial end face 603 of the stator assembly 122. In various embodiments, the plurality of low damping core slots 322 may be circumferentially aligned with the plurality of slots 312 disposed in the high damping core 210. In various embodiments, the plurality of low damping core teeth 324 may be circumferentially aligned with the plurality of teeth 314 disposed in the high damping core 210. In various embodiments, the low damping core 220 may comprise a back iron 326 extending circumferentially about axis of rotation 102 radially inward of the plurality of low damping core teeth 324. In various embodiments, the back iron 326 may bridge each adjacent pair of low damping core teeth of the plurality of low damping core teeth 324.

In various embodiments, the stator assembly 122 may further comprise a control winding 230 configured to receive a direct current (DC). In various embodiments, the control winding 230 may be in communication with the controller 270. In various embodiments, the control winding 230 may be in communication with an external voltage source. In various embodiments, the control winding 230 may comprise at least one of a wire or a foil. In various embodiments, the control winding 230 may comprise a copper wire. However, in various embodiments, the control winding 230 may comprise any conductor suitable for use in the stator assembly 122.

Figure 6:
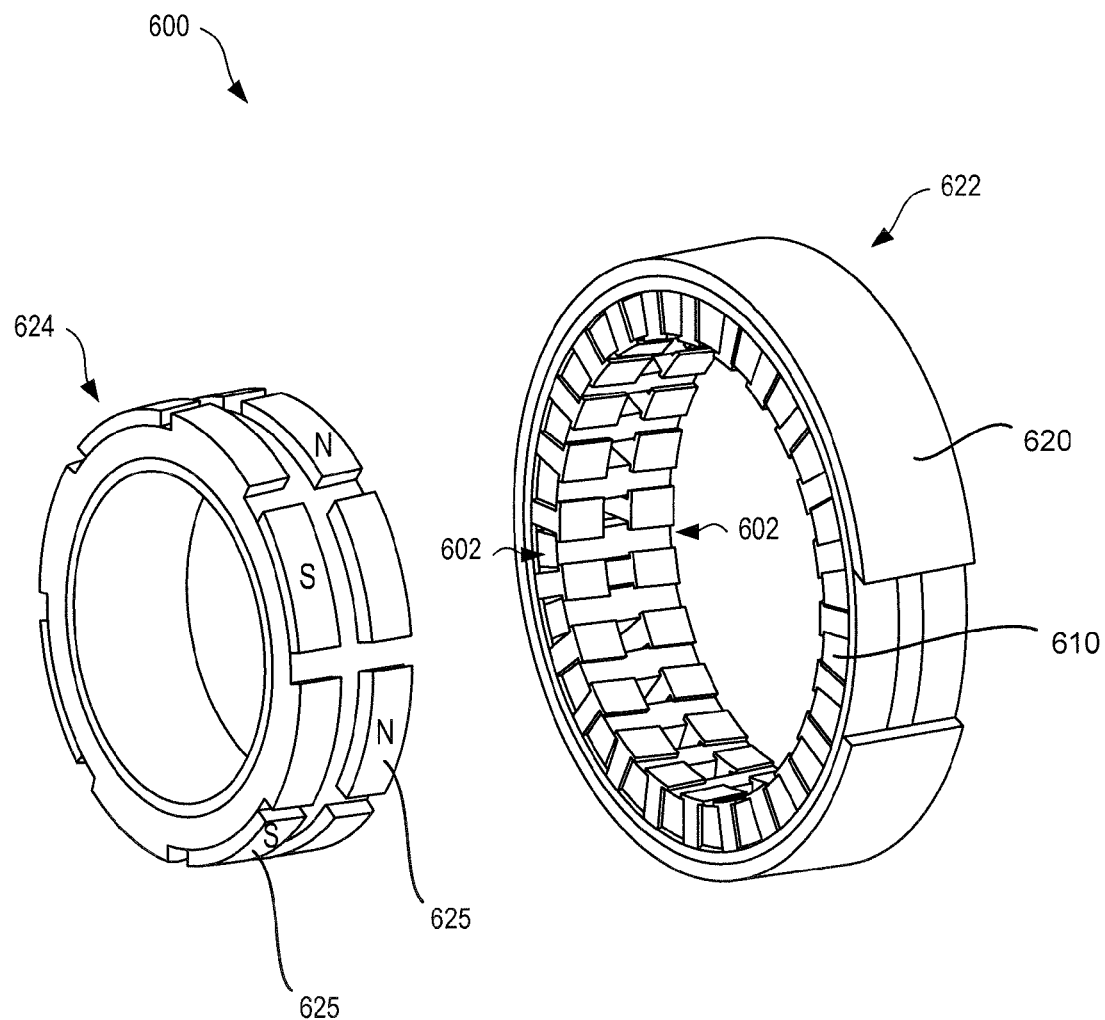
FIG. 6 illustrates an exploded perspective view of a portion of a saturation-controlled variable damper having a conventional configuration in accordance with various embodiments.

In various embodiments and with brief reference to FIG. 3 and FIG. 6, the control winding 230 may be wound about the high damping core 210 such that the control winding 230 enters each slot of the plurality of slots from at least one of the first axial end face 602 or the second axial end face 603. In various embodiments, the control winding 230 may be wound circumferentially about the bridge portion 316 between adjacent teeth of the plurality of teeth 314. In various embodiments, the control winding 230 may be wound about the high damping core 210 such that the control winding 230 exits each slot of the plurality of slots from at least one of the first axial end face 602 or the second axial end face 603. In various embodiments, the control winding 230 may be integrally continuous. Stated differently, in various embodiments, the control winding 230 may comprise a single member that is continuous from a first control winding end to a second control winding end.

In various embodiments, the stator assembly 122 may further comprise a secondary winding 332. In various embodiments, the secondary winding 332 may comprise at least one of a conductor wire or a conductor foil. In various embodiments, the secondary winding 332 may be wound about the low damping core 220.

Figure 4:
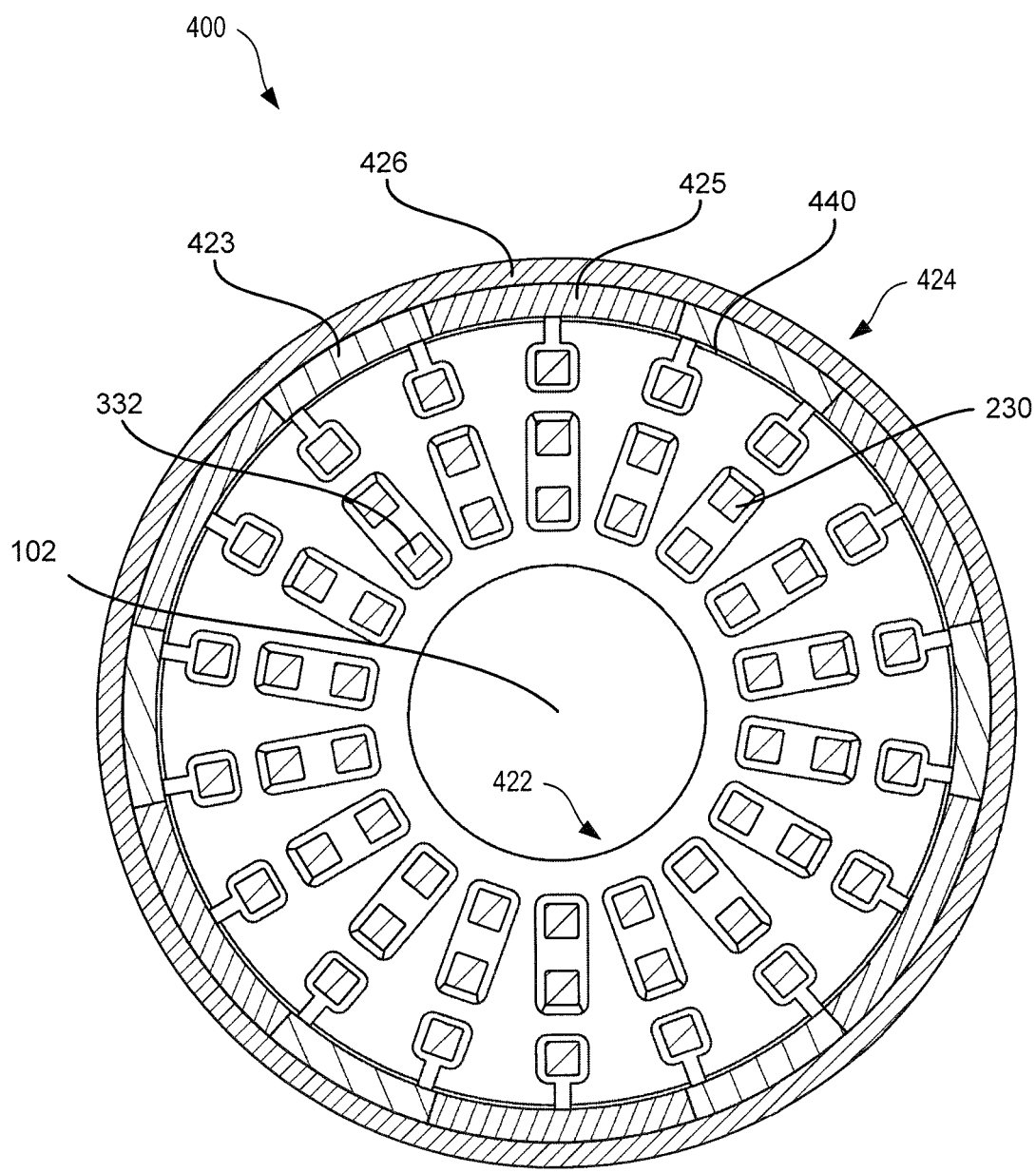
FIG. 4 illustrates a cross section view of a portion of a saturation-controlled variable damper having an "inside out" configuration in accordance with various embodiments.

With reference to FIG. 4, in various embodiments, the damper portion 120 (with momentary reference to FIG. 1) can be configured geometrically inside out compared to the version illustrated in FIG. 1. As such, a saturation-controlled variable damper 400 may comprise a stator assembly 422 at least partially surrounded by a rotor assembly 424. In various embodiments, the rotor assembly 424 may comprise a plurality of permanent magnets 423 retained by a yoke 425 and a retention sleeve portion 426. In various embodiments, a rotor air gap 440 separates the rotor assembly 424 and the stator assembly 422 in a typical fashion.

In various embodiments and with reference to FIGS. 1 and 4, the rotor assembly 424 is operatively coupled to the rotor shaft 126, such that rotation of the rotor shaft 126 causes rotation of the rotor assembly 424 about the axis of rotation 102. In various embodiments, the rotation of rotor shaft 126 causes rotation of the plurality of permanent magnets 423 about the stator assembly 422.

Figure 5A:
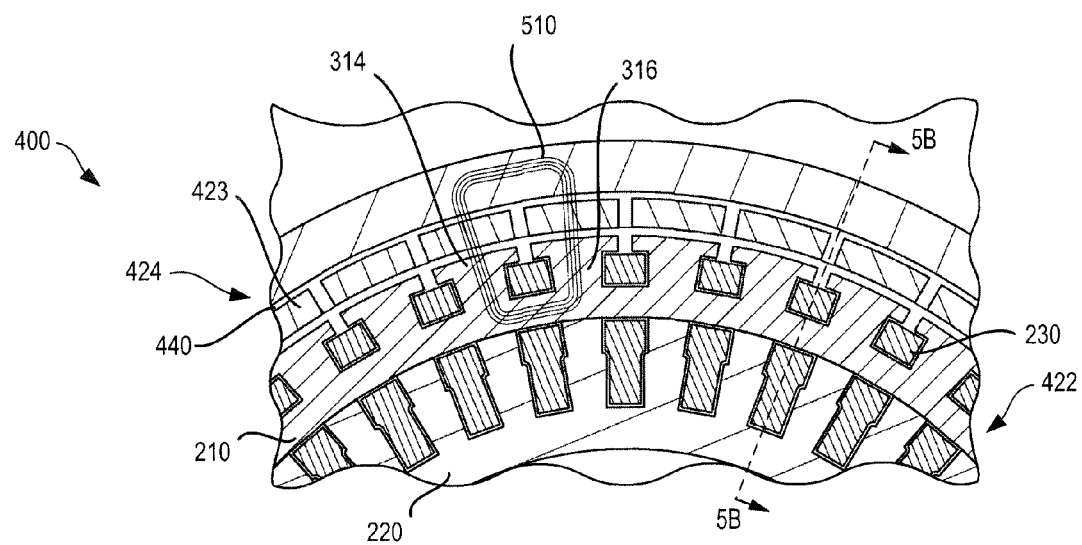
FIG. 5a illustrates a partial cross section view of a portion of a saturation-controlled variable damper having an "inside out" configuration in accordance with various embodiments.
Figure 5B:
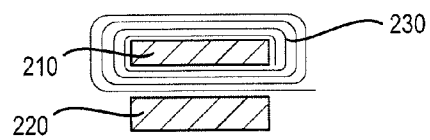
Figure 5C:
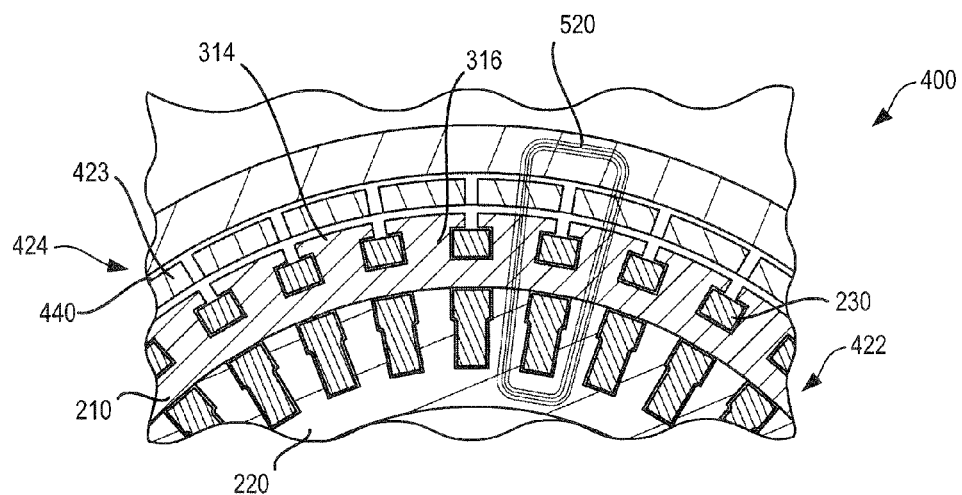
FIG. 5c illustrates a partial cross section view of a portion of a saturation-controlled variable damper having an "inside out" configuration in accordance with various embodiments.

With reference to FIGS. 5a, 5b, and 5c, in various embodiments, rotation of the rotor assembly 424 about the stator assembly 422 may create an eddy current in the stator assembly 422. In various embodiments, interaction of the plurality of permanent magnets 423 and the control winding 230 creates alternating magnetic flux within the saturation-controlled variable damper 400. In various embodiments, in response to interaction of the plurality of permanent magnets 423 and the control winding 230, the alternating magnetic flux is communicated about a high-damping magnetic flux path 510 within the saturation-controlled variable damper 400, as represented schematically in FIG. 5a. In various embodiments, the high-damping magnetic flux path 510 includes the rotor assembly 424, the rotor air gap 440, the bridge portion 316, the high damping core 210, and a portion of each tooth of the plurality of teeth 314 disposed between the rotor assembly 424 and the bridge portion 316. In various embodiments, the magnetic flux path 510 encircles at least a portion of the control winding 230 and, in use, creates an eddy current in the high damping core 210 and a first drag torque that opposes the rotation of the rotor assembly 424.

In various embodiments, application of a first current through the control winding 230 may saturate the high damping core 210 with a constant magnetic flux. In such embodiments, in response to saturation of the high damping core 210 with the constant magnetic flux, at least a portion of the alternating flux may be diverted from at least a portion of the high damping core 210 to at least a portion of the low damping core 220. In various embodiments, at least a portion of the alternating flux may be diverted such that it is communicated about a low-damping magnetic flux path 520, as represented schematically in FIG. 5c. In various embodiments, the low-damping magnetic flux path 520 includes the rotor assembly 424, the rotor air gap 440, the bridge 316, the low damping core 220, and the portion of each tooth of the plurality of teeth 314 disposed between the rotor assembly 424 and the bridge portion 316.

In various embodiments, the low damping core 220 may be configured to decrease or minimize generation of eddy current in the stator assembly 422 in response to communication of the alternating flux through the low-damping magnetic flux path 520. Accordingly, in response to communication of direct current through the control winding 230, interaction of the plurality of permanent magnets 423 and the control winding 230 may create a second drag torque that opposes the rotation of the rotor assembly 424. In such embodiments, the second drag torque may be less than the first drag torque.

In various embodiments, the amplitude of direct current communicated through the control winding 230 may be adjustably controlled. In such embodiments, in response to application of a second current through control winding 230, saturation of the high damping core 210 with a constant magnetic flux may increase or may decrease. In such embodiments, interaction of the plurality of permanent magnets 423 and the control winding 230 may create a third drag torque that opposes the rotation of the rotor assembly 424. In various embodiments, the third drag torque may be greater than, less than, or equal to the second drag torque.

The embodiments described hereinbefore comprise a rotor assembly having an "inside out" configuration, wherein the plurality of permanent magnets 423 are arranged in a generally cylindrical pattern facing radially inward toward the axis of rotation and the stator assembly. One skilled in the art will appreciate that in various embodiments, any of the hereinbefore described embodiments may comprise a saturation-controlled variable damper having a conventional configuration as shown in FIG. 6. Stated differently, in various embodiments and for any embodiment hereinbefore described, a saturation-controlled variable damper 600 may comprise a stator assembly 622 disposed radially outward of a rotor assembly 624, wherein the rotor assembly 624 comprises a plurality of permanent magnets 625 arranged in a generally cylindrical pattern facing radially outward toward the stator assembly 622. In such embodiments, a low damping core 620 may be disposed radially outward of a high damping core 610.

Figure 7:
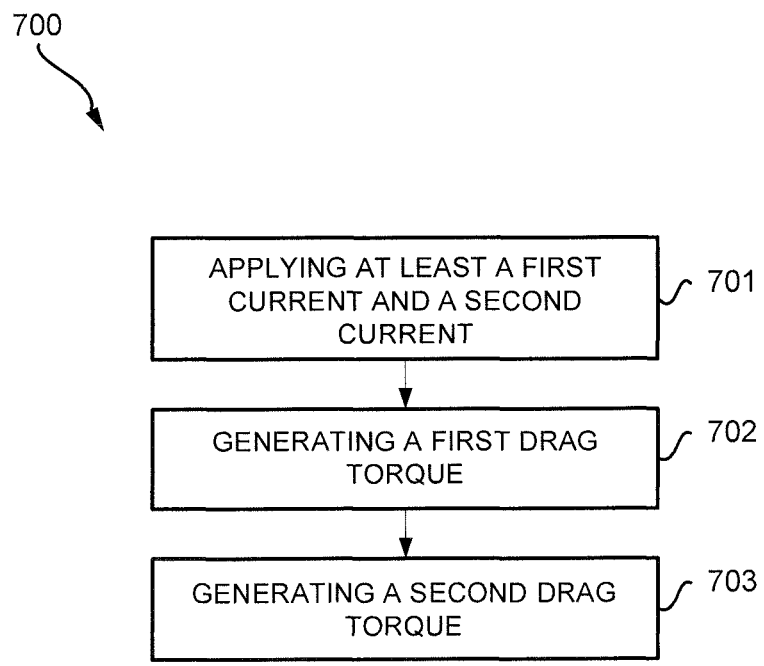
FIG. 7 illustrates a method of using a saturation-controlled variable damper in accordance with various embodiments.

With reference to FIG. 7, in various embodiments, a method 700 may allow variable control of a drag torque generated by the saturation-controlled variable damper 200. In various embodiments, the amplitude of a direct current applied through control winding 230 may be proportional to a level of saturation of the high damping core 210 with a constant magnetic flux. In various embodiments, the high damping core 210 may be partially saturated with a constant magnetic flux. In various embodiments, the level of saturation of the high damping core 210 with a constant magnetic flux may be indirectly proportional to the amount of drag torque generated by the saturation-controlled variable damper 200. Accordingly, in various embodiments, the drag torque generated by the saturation-controlled variable damper 200 may be adjustably controlled by controlling the amplitude of a direct current applied through control winding 230.

In various embodiments, the method 700 may comprise applying at least a first current and a second current through the control winding 230 of the saturation-controlled variable damper 200 (Step 701). In various embodiments, the method 700 may further comprise generating a first drag torque in response to the first current being applied through the control winding 230 (Step 702), and generating a second drag torque in response to the second current being applied through the control winding 230 (Step 703). In various embodiments, the applying may be by the controller 270. In various embodiments, the generating the first drag torque may be by the saturation-controlled variable damper 200. In various embodiments, the generating the second drag torque may be by the saturation-controlled variable damper 200.

In various embodiments, the first current may be zero. In various embodiments, the first drag torque may be greater than zero in response to the first current being zero. In various embodiments, the second current may be greater than zero. In various embodiments, the second drag torque may be less than the first drag torque in response to the second current being greater than the first current. Stated differently, in various embodiments, the drag torque generated by the saturation-controlled variable damper 200 may be inversely proportional to the current applied through the control winding 230. In various embodiments, the current may be continuously variable. In various embodiments, application of a continuously variable current through the control winding 230 may generate a continuously variable drag torque.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator assembly comprising:
   a high damping core;
   a low damping core coaxially aligned with the high damping core;
   a plurality of slots defined in at least one of the high damping core and the low damping core and extending between a first axial end face and a second axial end face of the at least one of the high damping core and the low damping core;
a control winding being integrally continuous and successively wound through the plurality of slots such that the control winding enters the plurality of slots from at least one of the first axial end face or the second axial end face, the control winding being configured to receive a current;
a controller; and
a tangible, non-transitory memory configured to communicate with the controller, the tangible, non-transitory memory having instructions stored thereon that, in response to execution by the controller, cause the controller to perform operations comprising:
applying, by the controller, at least a first current and a second current through the control winding, and
generating, by the controller, at least a first drag torque and a second drag torque with the first drag torque being generated in response to the first current being applied through the control winding and the second drag torque being generated in response to the second current being applied through the control winding.

2. The stator assembly of claim 1, wherein the high damping core and the low damping core comprise portions of an integral stator.

3. The stator assembly of claim 1, wherein the control winding is configured to receive direct current.

4. The stator assembly of claim 3, wherein the low damping core comprises a plurality of laminations.

5. The stator assembly of claim 3, wherein the high damping core comprises at least one of aluminum, copper, or steel.

6. The stator assembly of claim 3, wherein the low damping core comprises steel.

7. A saturation-controlled variable damper comprising:
a stator assembly disposed about an axis of rotation, the stator assembly comprising a high damping core, a low damping core, and a plurality of slots defined in at least one of the high damping core and the low damping core and extending between a first axial end face and a second axial end face of the at least one of the high damping core and the low damping core;
a rotor assembly coaxially aligned with the stator assembly and disposed about the axis of rotation;
a control winding being integrally continuous and successively wound through the plurality of slots, such that the control winding enters the plurality of slots from at least one of the first axial end face and the second axial end face, the control winding being configured to receive a current;
a controller; and
a tangible, non-transitory memory configured to communicate with the controller, the tangible, non-transitory memory having instructions stored thereon that, in response to execution by the controller, cause the controller to perform operations comprising:
applying, by the controller, at least a first current and a second current through the control winding, and
generating, by the controller, at least a first drag torque and a second drag torque with the first drag torque being generated in response to the first current being applied through the control winding and the second drag torque being generated in response to the second current being applied through the control winding.

8. The saturation-controlled variable damper of claim 7, wherein the high damping core and the low damping core comprise portions of an integral stator.

9. The saturation-controlled variable damper of claim 7, wherein the high damping core is coaxially aligned with the low damping core.

10. The saturation-controlled variable damper of claim 7, wherein the controller is configured to supply a direct current to the control winding.

11. The saturation-controlled variable damper of claim 9, wherein the low damping core comprises a plurality of laminations.

12. The saturation-controlled variable damper of claim 9, wherein the high damping core comprises at least one of aluminum, copper, or steel.

13. The saturation-controlled variable damper of claim 9, wherein the low damping core comprises steel.

14. A method comprising:
applying at least a first current and a second current through a control winding of a saturation-controlled variable damper, the saturation-controlled variable damper comprising:
a stator assembly disposed about an axis of rotation, the stator assembly comprising a high damping core, a low damping core, and a plurality of slots defined in at least one of the high damping core and the low damping core and extending between a first axial end face and a second axial end face of the at least one of the high damping core and the low damping core,
a rotor assembly coaxially aligned with the stator assembly and disposed about the axis of rotation, and
the control winding, wherein the control winding is integrally continuous and successively wound through the plurality of slots, such that the control winding enters the plurality of slots from at least one of the first axial end face and the second axial end face, the control winding being configured to receive a current; and
generating at least a first drag torque and a second drag torque with the first drag torque being generated in response to the first current being applied through the control winding and the second drag torque being generated in response to the second current being applied through the control winding.

15. The method of claim 14, wherein the first current is zero and the first drag torque is greater than zero.

16. The method of claim 14, wherein, in response to the first current being less than the second current, the first drag torque is greater than the second drag torque.

17. The method of claim 14, wherein, in response to the first current being greater than the second current, the first drag torque is less than the second drag torque.

18. The method of claim 14, wherein at least one of the first current and the second current is continuously variable and at least one of the first drag torque and the second drag torque is continuously variable.

19. The method of claim 14, wherein the high damping core and the low damping core comprise portions of an integral stator.

* * * * *